(12) United States Patent
Sen et al.

(10) Patent No.: US 11,144,128 B2
(45) Date of Patent: Oct. 12, 2021

(54) SYSTEMS AND METHODS FOR CONTROLLING VIDEO WALL CONTENT USING AIR GESTURES

(71) Applicant: Verizon Patent and Licensing Inc., Arlington, VA (US)

(72) Inventors: Indraneel Sen, Livingston, NJ (US); Yuk Lun Li, Morganville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 55 days.

(21) Appl. No.: 16/689,541

(22) Filed: Nov. 20, 2019

(65) Prior Publication Data

US 2021/0149496 A1 May 20, 2021

(51) Int. Cl.
| | | |
|---|---|---|
| *G06F 3/01* | (2006.01) | |
| *G06K 9/00* | (2006.01) | |
| *G06T 7/20* | (2017.01) | |
| *G06F 3/14* | (2006.01) | |
| *G06T 7/70* | (2017.01) | |
| *H04W 76/10* | (2018.01) | |

(52) U.S. Cl.
CPC ............ *G06F 3/017* (2013.01); *G06F 3/1446* (2013.01); *G06K 9/00335* (2013.01); *G06K 9/00362* (2013.01); *G06T 7/20* (2013.01); *G06T 7/70* (2017.01); *G06T 2207/10016* (2013.01); *G06T 2207/20081* (2013.01); *G06T 2207/30196* (2013.01); *H04W 76/10* (2018.02)

(58) Field of Classification Search
CPC ......... G06F 3/017; G06F 3/1446; G06T 7/70; G06T 7/20; G06T 2207/10016; G06T 2207/20081; G06T 2207/3019; G06K 9/00335; G06K 9/00362; H04W 76/10
See application file for complete search history.

(56) References Cited

U.S. PATENT DOCUMENTS

| | | | | |
|---|---|---|---|---|
| 8,325,214 | B2* | 12/2012 | Hildreth ................. | G06F 3/017 348/14.03 |
| 9,245,177 | B2* | 1/2016 | Perez .................. | G06K 9/00355 |
| 9,344,615 | B1* | 5/2016 | Bostick ................ | G06K 7/1417 |
| 9,390,726 | B1* | 7/2016 | Smus ...................... | G06F 3/017 |
| 9,652,076 | B1* | 5/2017 | Newcomb ............ | G06F 3/0485 |
| 10,043,516 | B2* | 8/2018 | Saddler ............... | G10L 15/1815 |
| 2006/0179451 | A1* | 8/2006 | Sung .................. | H04N 21/4788 725/12 |
| 2011/0298827 | A1* | 12/2011 | Perez ................. | G06K 9/00355 345/647 |
| 2011/0304632 | A1* | 12/2011 | Evertt ..................... | G06F 3/017 345/474 |
| 2012/0131518 | A1* | 5/2012 | Lee ...................... | G06F 3/04812 715/863 |

(Continued)

*Primary Examiner* — Dmitriy Bolotin

(57) ABSTRACT

A device may include a memory storing instructions and processor configured to execute the instructions to receive a video image stream of a scene. The device may be further configured to perform person detection on the received video image stream to identify a plurality of persons; perform gesture detection on the received video image stream to identify a gesture; select a person from the plurality of persons to associate with the identified gesture; and use the identified gesture to enable the selected person to control an object or area displayed on a video screen associated with the scene.

20 Claims, 10 Drawing Sheets

(56) References Cited

U.S. PATENT DOCUMENTS

| | | | |
|---|---|---|---|
| 2012/0242800 A1* | 9/2012 | Ionescu | G06F 3/017 |
| | | | 348/46 |
| 2012/0268372 A1* | 10/2012 | Park | G06F 3/0304 |
| | | | 345/158 |
| 2013/0053068 A1* | 2/2013 | Barkay | H04W 4/021 |
| | | | 455/456.3 |
| 2013/0055150 A1* | 2/2013 | Galor | G06F 3/017 |
| | | | 715/784 |
| 2013/0120243 A1* | 5/2013 | Kim | H04N 21/4223 |
| | | | 345/156 |
| 2016/0266653 A1* | 9/2016 | Liu | G06F 3/0304 |
| 2017/0090589 A1* | 3/2017 | Sharma | G06F 9/541 |
| 2018/0052521 A1* | 2/2018 | Kamiya | G06F 3/011 |
| 2019/0138107 A1* | 5/2019 | Nietfeld | A63F 13/67 |
| 2019/0155495 A1* | 5/2019 | Klein | G06F 3/011 |
| 2019/0319868 A1* | 10/2019 | Svennebring | H04L 41/147 |

\* cited by examiner

SYSTEMS AND METHODS FOR CONTROLLING VIDEO WALL CONTENT USING AIR GESTURES

BACKGROUND INFORMATION

To satisfy the needs and demands of users of mobile communication devices, providers of wireless communication services continue to improve and expand available services as well as networks used to deliver such services. An important way in which users interact with devices is through gesture control. For example, a user may interact with a smart phone or a tablet device by using gestures on a touch interface, such as a touchscreen. However, in situations where multiple users attempt to interface with a device, such touch gestures are not adequate. Therefore, enabling a group of users to interact with a device poses various challenges.

DETAILED DESCRIPTION OF PREFERRED EMBODIMENTS

Figure 1:
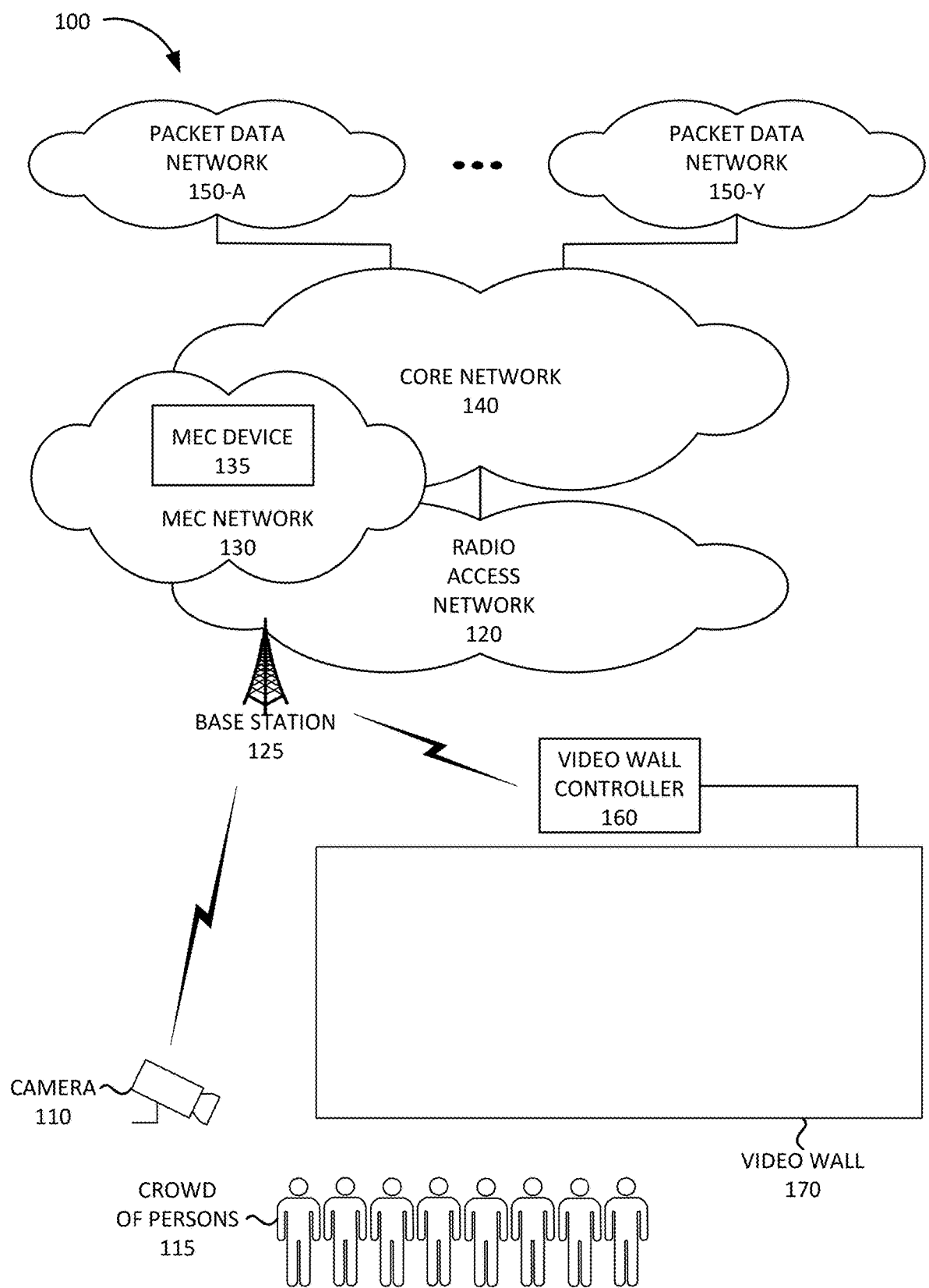
FIG. 1 illustrates an environment according to an implementation described herein.

The following detailed description refers to the accompanying drawings. The same reference numbers in different drawings identify the same or similar elements.

A public venue, such as a stadium, concert hall, nightclub, an outdoor mall, and/or another type of venue may include a video wall. A video wall may correspond to a single large screen or monitor or to a multi-monitor/multi-screen display that includes an array of light emitting diode (LED) panels, laser phosphor displays, projection screens, rear projection cubes, and/or other types of display monitors. The video wall may display interactive content. For example, the interactive content may enable multiple users at the venue to control objects or areas displayed on the video wall.

Using touch gestures, such as those used when interacting with a single display device such as a smart phone or a table device, to control content displayed on video wall may not be effective. Furthermore, requiring users to employ their smart phones to connect to a video wall controller to control the displayed content may be cumbersome and inefficient. Therefore, an easier and more efficient technique may include enabling users to perform air gestures and analyzing the air gestures to control the content displayed on the video wall. The air gestures may be analyzed by capturing a video image stream of the users and employing computer vision and/or machine learning to detect and analyze gestures in the captured video image stream.

Implementations described herein relate to controlling large video wall content using air gestures by a crowd of users, a group of dispersed individual users, and/or another type of group of users in an area. A computer device may be configured to implement a gesture analysis system to receive, from a camera, a video image stream of a scene that includes a group of people and is associated with a video wall. The gesture analysis system may be further configured to perform person detection on the received video image stream to identify persons in the video image stream, perform a gesture detection on the video image stream to identify a gesture in the received video image stream, select a user from the identified persons to associate with the identified gesture, and use the identified gesture to enable the selected user to control an object or area displayed on the video wall associated with the scene.

Keeping track of the gestures of multiple users may require scaling computational resources as needed. For example, for each of the identified persons for whom a gesture is detected, as part of the gesture detection, the computer device may activate a gesture tracking instance. Each gesture tracking instance may include, for example, a computer vision machine learning model running on a hardware accelerator device. Thus, if the gesture analysis system identifies another gesture in the received video image stream, associated with a different user from the identified persons, the gesture analysis system may select the user and activate another gesture tracking instance in response. Thus, for each identified gesture, the gesture analysis system may associate the identified gesture with another user and enable each user to control a different object or area displayed on the video wall.

The particular object or area controlled by a particular user may be based on the position of the gesture in relation to the particular user. For example, if the user reaches up to the left, the gesture analysis system may select an object or area on the left side of the video wall, and if the user reaches up to the right, the gesture analysis system may select an object or area on the right side of the video wall. Thus, the gesture analysis system may determine a position of the identified gesture in relation to the selected user and select the object or area based on the determined position.

To control the object or area displayed on the video wall, the gesture analysis system may select an object or area identifier associated with the object or area based on the identified gesture, assign the selected object or area identifier to the selected user, track gestures made by the selected user, generate action identifiers based on the tracked gestures, and apply the generated action identifiers to the selected object or area identifier.

In some implementations, the action identifiers may be based on the context associated with the video wall. For example, different types of content may be associated with different contexts and, therefore, a particular gesture may be interpreted as a first action in association with a first context and as a second action in association with a second context. Thus, the gesture analysis system may obtain a context associated with the video wall, select a control action for an identified gesture based on the obtained context, and apply the selected control action to an object or area displayed on the video wall associated with the identified gesture. For example, the gesture analysis system may output a control message that includes a control action and a screen position, and provide the control message to a device controlling the video wall.

While a user is controlling an object or area, the controlled object or area may be made unavailable to be controlled by other users until the user releases the controlled object or area. A user may control an object or area until the user makes a release gesture, after a period of inactivity by the user, or after a maximum time period for which a particular user is allowed to control an object or area has elapsed. Thus, the gesture analysis system may be configured to detect a gesture associated with a user, determine that the detected other gesture corresponds to a release gesture, and release control of the object or area from the user, in response to determining that the detected other gesture corresponds to the release gesture.

Furthermore, in some implementations, users at remote locations may collaborate to control content that is shared to multiple remote locations. Thus, a first gesture analysis system may provide output, such as a control message that specifies a control action and an object or area, associated with content displayed on a video wall, to a second gesture analysis system at a different location. The second gesture analysis system may then provide the control message to a device controlling the video wall.

Analyzing air gestures of multiple users to control video wall content may require low latency and large amounts of processing speed and capacity, especially in cases of real time or near real time events. Implementations described herein further relate to using a camera with a high throughput and low latency connection and a computer system with high capacity hardware accelerators to control large video wall content using air gestures by a crowd of users. For example, the required low latency and processing speed and capacity may be achieved using a camera with a wireless Fifth Generation (5G) New Radio (NR) connection to a base station and a Multi-access Edge Computing (MEC) network associated with the base station.

5G NR air interface technology, which may use millimeter (mm) wave frequencies, may provide for high bandwidth and low latency communication in comparison to other wireless network technologies. In order to further reduce latency and/or other parameters associated with network performance, and to reduce the load of traffic in core networks and gateway devices and to provide more efficient services, a provider of communication services that manages a Radio Access Network (RAN) may deploy a MEC network that includes one or more MEC devices. The MEC devices in the MEC network may provide application services, and/or other types of services, to user equipment (UE) devices wirelessly connected to a particular base station.

The MEC network may be located in geographic proximity to a base station, and/or may be close to the base station from a network topology perspective. For example, the MEC network may be physically closer to the base station than to other base stations, and/or may be reached with fewer network device traversals ("hops") than traffic from other base stations or traffic destined to devices in other packet data networks, such as a cloud computing center located in a core network or private packet data network. When a UE device requests a service that is available via a MEC network, the UE device may be connected to a MEC device in the MEC network, rather than to an application server in the core network or an external packet data network (e.g., the Internet at large). Different MEC networks may service different sets of base stations. A set of MEC networks distributed in different locations may be referred to as a "distributed edge" or "distributed edge computing." A gesture analysis system, as described herein, may be located in a MEC network associated with a base station that communicates with a camera that captures a video stream of air gestures made by a crowd of users attempting to control content displayed on a video wall.

FIG. 1 is a diagram of an exemplary environment 100 in which the systems and/or methods, described herein, may be implemented. As shown in FIG. 1, environment 100 may include a camera 110, a crowd of users 115, a RAN 120, MEC networks 130, a core network 140, and packet data networks 150-A to 150-Y (referred to herein collectively as "packet data networks 150" and individually as "packet data network 150"), a video wall controller 160, and a video wall 170.

Camera 110 may include any device with the functionality to capture video images of the crowd of users 115. Camera 110 may include a digital camera for capturing and digitizing images using an array of sensors. The captured image data may include a continuous image sequence (e.g., video), a limited image sequence, still images, and/or a combination thereof. Camera 110 may capture image and/or video data using visible light, infrared light, and/or other non-visible electromagnetic radiation (e.g., ultraviolet light, infrared light, terahertz radiation, etc.).

In some implementations, camera 110 may include a depth camera that captures depth information. For example, for each pixel, the depth camera may obtain color information as well as depth information. In some implementations, camera 110 may include one or more illumination sources. The illumination sources may include a visible light illumination source and/or an infrared illumination source. For example, camera 110 may emit a set of infrared or near-infrared beams to obtain depth information. Additionally, or alternatively, camera 110 may include a thermal camera and/or radar device for radar imaging. Camera 110 may include wireless communication functionality. For example, camera 110 may communicate using machine-to-machine (M2M) communication, such as machine-type communication (MTC), and/or another type of M2M communication. While a single camera 110 is shown in FIG. 1 for illustrative purposes, in practice, multiple cameras 110 may be installed to capture video of crowd of persons 115.

Camera 110 may stream a video of the crowd of users 115 and transmit the video stream over a wireless connection to a base station 125 in RAN 120. RAN 120 may enable camera 110 and video wall controller 160 to communicate via wireless signals via MEC network 130 and/or via core network 140. RAN 120 may include one or more base stations 125.

Each base station 125 may include devices and/or components configured to enable wireless communication with camera 110, video wall controller 160, and/or other UE devices. Camera 110 and video wall controller 160 may be perceived as UE devices by base station 125. Base station 125 may include a Fourth Generation (4G) base station configured to communicate with UE devices as an eNodeB that uses a 4G Long Term Evolution (LTE) air interface. Additionally, or alternatively, base station 125 may include a 5G base station configured to communicate with UE devices as a gNodeB that uses a 5G NR air interface. A gNodeB may include one or more antenna arrays configured to send and receive wireless signals in the mm-wave frequency range.

Furthermore, RAN 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality. Base station 125 may be associated with MEC 130.

MEC network 130 may provide MEC services for UE devices attached to base station 125. MEC network 130 may be in proximity to the one or more base stations 125 from a geographic and network topology perspective. As an example, MEC network 130 may be located on a same site as base station 125. As another example, MEC network 130 may be geographically closer to base station 125, and reachable via fewer network hops and/or fewer switches, than other base station and/or packet data networks 150. As yet another example, MEC network 130 may be reached without having to interface with a gateway device, such as a 4G Packet Data Network Gateway (PGW) or a 5G User Plane Function (UPF).

MEC network 130 may interface with RAN 120 and/or with core network 140 via a MEC gateway device (not shown in FIG. 1). In some implementations, MEC network 130 may be connected to RAN 120 via a direct connection to base station 125. For example, in a 4G network, MEC network 130 may connect to an eNodeB via an Si interface, or, in a 5G network, MEC network 130 may connect to a gNodeB via an N3 interface. In other implementations, MEC network 130 may include, or be included in, core network 140. As an example, in a 4G network, MEC network 130 may connect to a Serving Gateway (SGW) via an S5 interface, or, in a 5G network, MEC network 130 may connect to a Session Management Function (SMF) via an N4 interface. MEC network 130 may support UE device mobility and handover application sessions between MEC network 130 and another MEC network.

MEC network 130 may include a MEC device 135. MEC network 130 may support device registration, discovery, and/or management of MEC devices 135 in MEC network 130. MEC device 135 may include particular hardware capabilities, such as particular central processing units (CPUs), graphics processing units (GPUs), tensor or dataflow processing units, hardware accelerators, and/or other types of hardware capabilities. Furthermore, MEC device 135 may include particular software capabilities, such as a particular operating system, virtual machine, virtual container, application, and/or another type of software capability.

MEC device 135 may connect to base station 125 in RAN 120 and provide one or more MEC services to UE devices connected to base station 125. As an example, a MEC service may include a service associated with a particular application, such as a content deliver system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, use of GPUs for processing of graphic information and/or other types of parallel processing, and/or other types of cloud computing services. As yet another example, a MEC service may include a network service, such as authentication, for example via a certificate authority for a Public Key Infrastructure (PKI) system, a local Domain Name System (DNS) service, implementation of a virtual network function (VNF), and/or another type of network service. As yet another example, a MEC service may include control of Internet of Things (IoT) devices, such as hosting an application server for autonomous vehicles, a security system, a manufacturing and/or robotics system, and/or another type of IoT system. Consistent with implementations described herein, MEC device 135 may include a gesture analysis system to analyze gestures made by users in a video stream received from camera 110 and provide control actions based on the analyzed gestures to video wall controller 160.

Core network 140 may manage communication sessions for UE devices serviced by base station 125. For example, core network 140 may establish an IP connection between UE devices and a packet data network 150. Furthermore, core network 140 may enable UE devices to communicate with an application server, and/or another type of device, located in a packet data network 150 using a communication method that does not require the establishment of an Internet Protocol (IP) connection between a UE device and packet data network 150, such as, for example, Data over Non-Access Stratum (DoNAS). For example, in other implementations, a gesture analysis system may be included in a server device in core network 140, rather than in MEC device 135 in MEC network 130.

In some implementations, core network 140 may include an LTE core network (e.g., an evolved packet core (EPC) network). In other implementations, core network 140 may include a Code Division Multiple Access (CDMA) core network. For example, the CDMA access network may include a CDMA enhanced High Rate Packet Data (eHRPD) network (which may provide access to an LTE core network). An EPC network may include devices that implement network functions that include a Mobility Management Entity (MME) that implements control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 150; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 140 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 150, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device; and/or other types of network functions.

Packet data networks 150-A to 150-N may each include a packet data network. A particular packet data network 150 may be associated with an Access Point Name (APN) and a UE device may request a connection to the particular packet data network 150 using the APN. Packet data network 150 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. For example, in other implementations, a gesture analysis system may be included in a server device in packet data network 150, rather than in MEC device 135 in MEC network 130.

Video wall controller 160 may include one or more computer devices that control video wall 170. Video wall 170 may include a single large monitor or screen, or a multi-monitor/multi-screen display that includes an array of LED panels, laser phosphor displays, projection screens, rear projection cubes, and/or other types of display monitors. Video wall 170 may display interactive content that is controlled by video wall controller 160. For example, video wall controller 160 may render a scene of two-dimensional and/or three-dimensional objects and may update the position, size, orientation, color, shading, etc., of the displayed objects based on gestures made by the users, captured by camera 110, and analyzed and interpreted by a gesture analysis system implemented by MEC device 135 and/or another device. Video wall controller 160 may coordinate the content displayed on multiple monitors of video wall 170 to make video wall 170 appear as a single display. In some implementations, video wall 170 may be implemented as a set of head-mounted displays (HMDs) worn by a crowd of users for a virtual reality or an augmented reality application, rather than a large video display mounted on, or projected onto, a wall.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
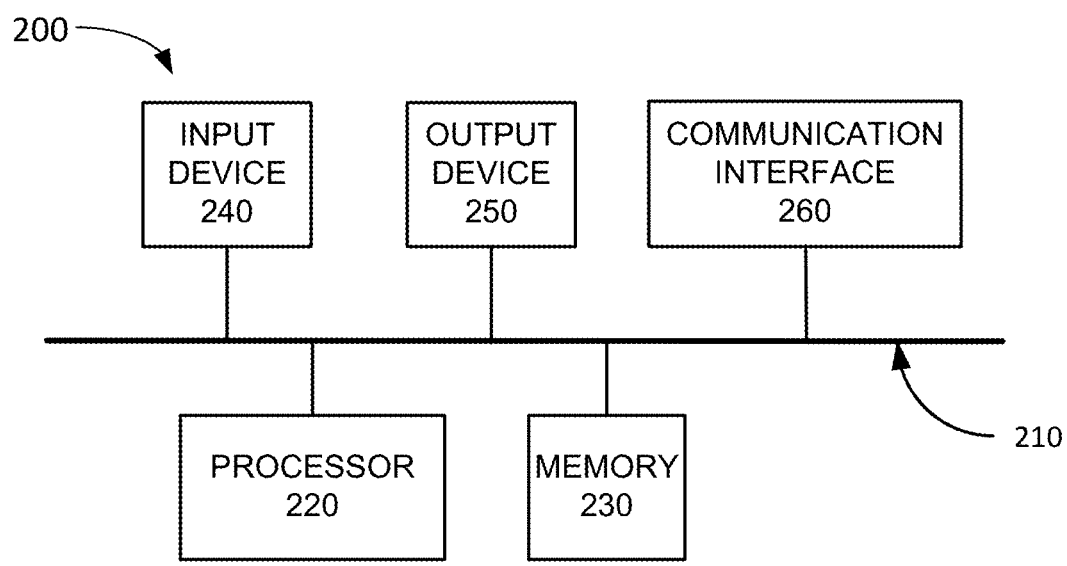
FIG. 2 illustrates exemplary components of a device that may be included in the environment of FIG. 1 according to an implementation described herein.

FIG. 2 is a diagram illustrating example components of a device 200 according to an implementation described herein. Camera 110, base station 125, MEC device 135, video wall controller 160, and/or video wall 170 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to controlling video wall content using air gestures. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
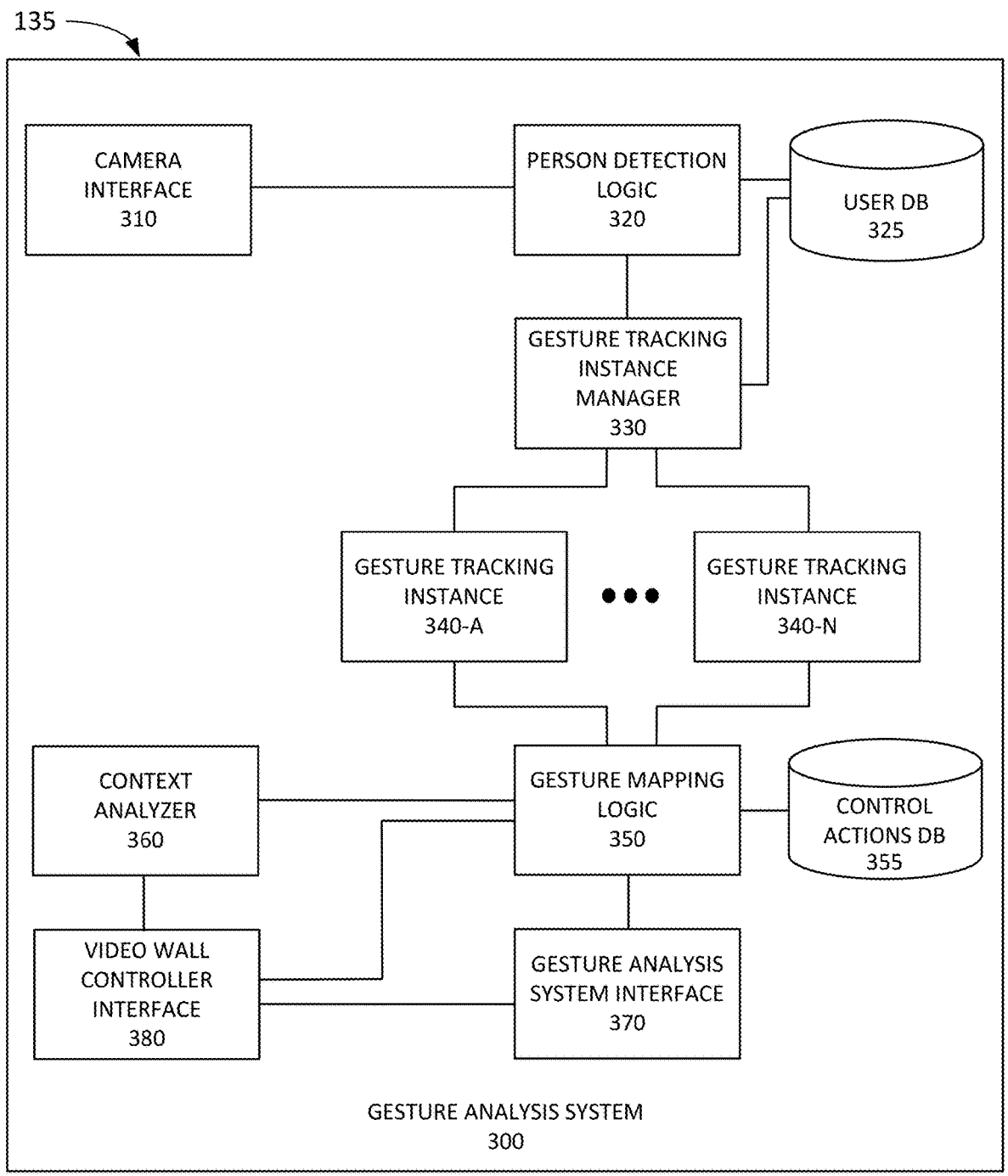
FIG. 3 illustrates exemplary components of the Multi-access Edge Computing (MEC) device of FIG. 1 according to an implementation described herein.

FIG. 3 is a diagram illustrating exemplary components of MEC device 135. The components of MEC device 135 may be implemented, for example, via processor 220 executing instructions from memory 230. Alternatively, some or all of the components of MEC device 135 may be implemented via hard-wired circuitry. Furthermore, some or all of the components of MEC device 135 may be implemented using one or more hardware accelerators, such as GPUs, tensor or dataflow processing units, and/or other types of hardware accelerators.

As shown in FIG. 3, MEC device 135 may include a gesture analysis system 300. Gesture analysis system 300 may perform gesture analysis for crowd of persons 115 and provide the results of the gesture analysis to video wall controller 160. Although gesture analysis system 300 is shown as being included in MEC device 135, in other implementations, some or all of the components of gesture analysis system 300 may be implemented in a device outside of MEC network 130 (e.g., in core network 140) and may be coupled to low latency device (e.g., hardware accelerators) of MEC device 135 as needed to perform low latency processing. As shown in FIG. 3, gesture analysis system 300 may include a camera interface 310, a person detection logic 320, a user DB 325, a gesture tracking instance manager 330, gesture tracking instances 340-A to 340-N (referred to herein collectively as "gesture tracking instances 340" and individually as "gesture tracking instance 340"), a gesture mapping logic 350, a control actions DB 355, a context analyzer 360, a gesture analysis system interface 370, and a video wall controller interface 380.

Camera interface 310 may be configured to communicate with camera 110. For example, camera interface 310 may receive a video stream from camera 110 and may include a video decoder that extract individual images from the received video stream for analysis.

Person detection logic 320 may identify persons in video images received from camera interface 310. For example, person detection logic 320 may include a computer vision machine learning model trained to detect individual people in a crowd. The machine learning model may perform segmentation to generate a boundary around each identified person in an image. In some implementations, the machine learning model may include a trained convolutional neural network (CNN) and/or another type of deep learning neural network. In other implementations, the machine learning model may include a different type of computer vision model that perform segmentation to identify a person, such as, for example, a region growing method, a level-set method, a graph cut method, a watershed method, a dynamic programming method, and/or another type of segmentation technique.

Person detection logic 320 may provide information relating to identified persons in an image to gesture tracking instance manager 330 and/or may store the information in user DB 325. User DB 325 may store information relating to persons identified in the video images received from camera interface 310. Exemplary information that may be stored in user DB 325 is described below with reference to FIG. 5.

Gesture tracking instance manager 330 may manage gesture tracking instances 340. Gesture tracking instance manager 330 may include a trained machine learning model that determines, for each person identified by person detection logic 320, whether the identified person is making a gesture. The machine learning model may be trained, for example, whether a particular person has raised an arm above the person's head, whether an arm position for the particular person has changed by at least a particular distance between a first image and a second image, whether the person's hand is visible, and/or based on another one or more criteria. If gesture tracking instance manager 330 detects an active gesture for an identified person, gesture tracking instance manager 330 may activate a new gesture tracking instance 340 for the identified person.

Gesture tracking instance 340 may include a machine learning model trained to perform computer vision to identify and classify gestures. For example, the machine learning model may take as input an image, part of an image, or a set of images, that includes an identified person and output a set of likelihood values for a set of gesture categories. In some implementations, the identified person may include a segmentation boundary around the person generated by person detection logic 320. In other implementations, gesture tracking instance 340 may perform the segmentation. In yet other implementations, gesture tracking instance 340 need not perform segmentation in order to classify an image, part of an image, or a set of images into a particular gesture category.

In some implementations, gesture tracking instance 340 may include a trained deep learning neural network, such as, for example, a CNN. In other implementations, gesture tracking instance 340 may include another type of trained classifier, such as, for example, a Support Vector Machine (SVM) classifier, a K-nearest neighbors (KNN) classifier, a naïve Bayesian classifier, a random forest classifier, a logistic regression classifier, a linear discriminant analysis classifier, a quadratic linear discriminant analysis classifier, a maximum entropy classifier, a kernel density estimation classifier, a principal component analysis (PCA) classifier, etc.

Gesture mapping logic 350 may map gestures to control actions based on classifications made by gesture tracking instances 340, information received from context analyzer 360, and information stored in control actions DB 355. Control action DB 355 may store information that maps gestures to control actions. Context analyzer 360 may obtain a context from video wall controller interface 380. The context may, for example, identify a particular application running on video wall controller 160.

For example, for each context, control action DB 355 may relate particular gestures to particular control actions. For example, for a first context, such as a context for a collaborative art project in which users place mosaic tiles on a canvas, a first gesture may correspond to a "select" control action, a second gesture may correspond to a "move left" control action, a third gesture may correspond to a "move right" control action, a fourth gesture may correspond to a "release" control action, etc. For a second context, such as context for playing a game with a ball, the first gesture may correspond to a "catch ball" control action, a second gesture may correspond to a "rotate to the left" control action, a third gesture may correspond to a "rotate to the right" control action, a fourth gesture may correspond to a "throw" control action, etc.

Gesture analysis system interface 370 may configured to communicate with other gesture analysis systems 300. For example, in some implementations, video walls 170 at multiple locations may display identical content and users at the multiple locations may interact. For example, users at multiple locations may participate in a game, a collaborative art project, an instructional program, etc. Gesture analysis system interface 370 may send a set of control actions for a set of objects or areas to another gesture analysis system 300 so that the other gesture analysis system 300 may provide the control actions to video wall controller 160. Thus, users at a different location may be able to control content displayed on video wall 170.

Video wall controller interface 380 may be configured to communicate with video wall controller 160. For example, video wall controller interface 380 may provide a set of control actions for a set of objects or areas displayed on video wall 170 and video wall controller 160 may implement the control actions. Additionally, video wall controller interface 380 may obtain information from video wall controller 160, such as context associated with content displayed on video wall 170.

Although FIG. 3 shows exemplary components of MEC device 135, in other implementations, MEC device 135 may include fewer components, different components, differently arranged components, or additional components than depicted in FIG. 3. Additionally, or alternatively, one or more components of MEC device 135 may perform functions described as being performed by one or more other components of MEC device 135.

Figure 4:
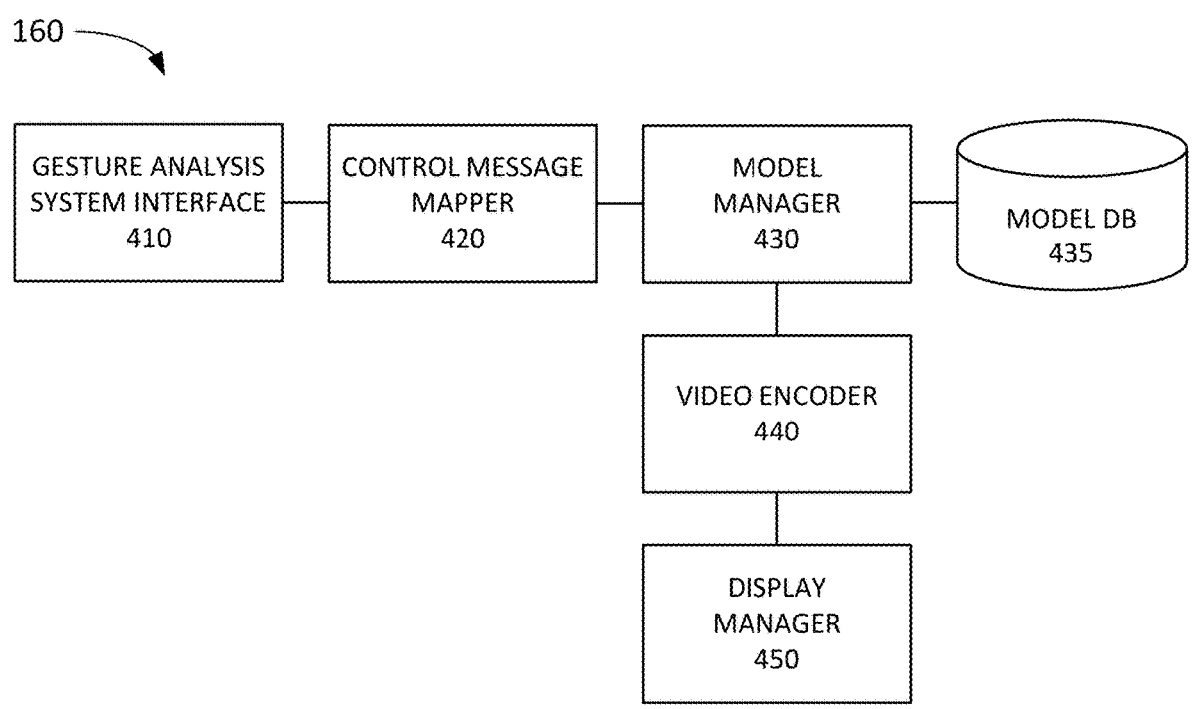
FIG. 4 illustrates exemplary components of the video wall controller of FIG. 1 according to an implementation described herein.

FIG. 4 is a diagram illustrating exemplary components of video wall controller 160. The components of video wall controller 160 may be implemented, for example, via processor 220 executing instructions from memory 230. Alternatively, some or all of the components of video wall controller 160 may be implemented via hard-wired circuitry. Furthermore, in some implementations, some or all of the functionality of video wall controller 160 shown in FIG. 4 may be included in gesture analysis system 300 of MEC device 135. As shown in FIG. 4, video wall controller 160 may include a gesture analysis system interface 410, a control message mapper 420, a model manager 430, a model DB 435, a video encoder 440, and a display manager 450.

Gesture analysis system interface 410 may be configured to communicate with gesture analysis system 300. For example, gesture analysis system interface 410 may receive a control message that specifies an object or area displayed on video wall 170 and that specifies a control action for the object or area. Moreover, gesture analysis system interface 410 may provide information to gesture analysis system 300, such as, for example, information identifying a context associated with the content displayed on video wall 170.

Control message mapper 420 may map a set of control actions into a set of instructions for model manager 430. Model manager 430 may generate and/or render objects in a scene to be displayed on video wall 170 based on information stored in model DB 435 and information received from control message mapper 420. Model DB 435 may store information relating to objects associated with a particular application. Video encoder 440 may generate and encode a video stream to be displayed on video wall 170 based on the scene rendered by model manager 430. Display manager 450 may coordinate the displays that comprise video wall 170 to make video wall 170 operate as a single display.

Although FIG. 4 shows exemplary components of video wall controller 160, in other implementations, video wall controller 160 may include fewer components, different components, differently arranged components, or additional components than depicted in FIG. 4. Additionally, or alternatively, one or more components of video wall controller 160 may perform functions described as being performed by one or more other components of video wall controller 160.

Figure 5:
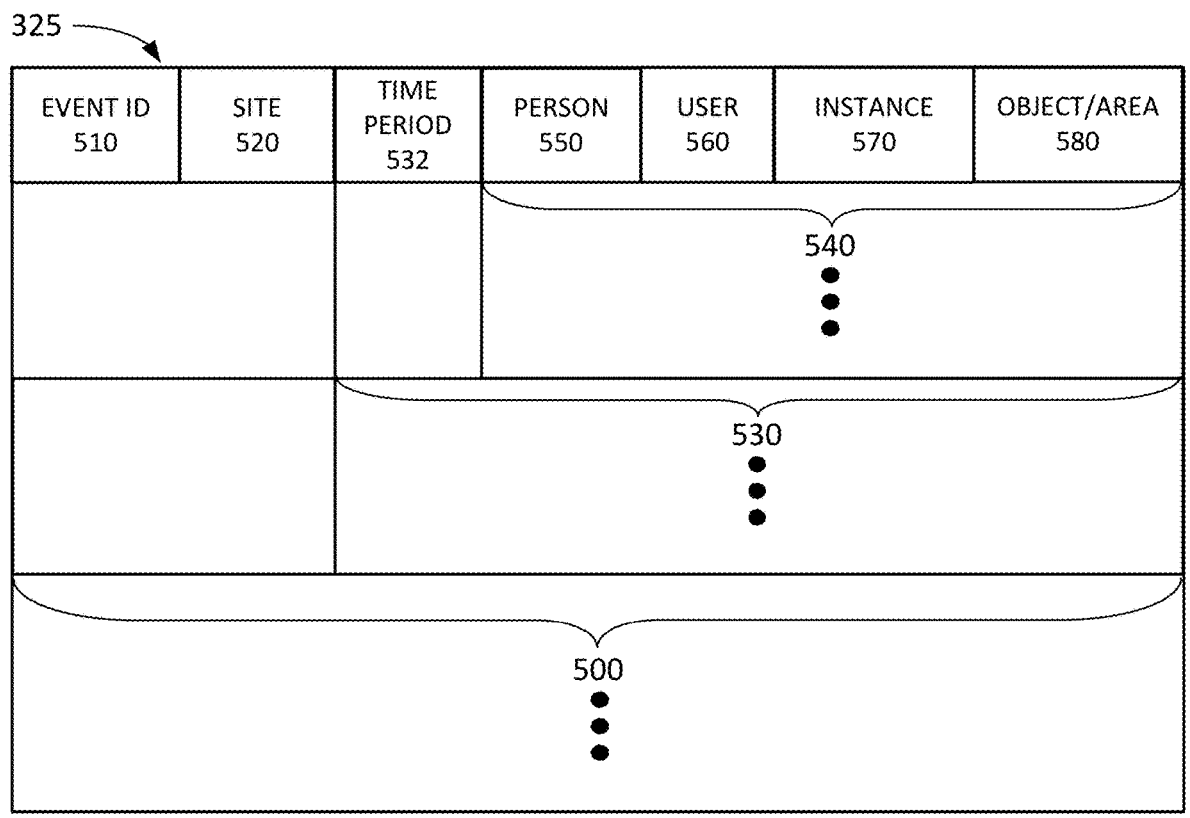
FIG. 5 illustrates exemplary components of the user database of FIG. 3 according to an implementation described herein.

FIG. 5 is a diagram illustrating exemplary information stored in user DB 325 according to an implementation described herein. As shown in FIG. 5, user DB 325 may include one or more event records 500. Each event record 500 may store information relating to a particular event associated with gesture analysis system 300. Each event record 500 may include an event identifier (ID) field 510, a site field 520, and one or more time period records 530.

Event ID field 510 may store an ID associated with a particular event, such as a music event at a music venue, a game event at a stadium, etc. Site field 520 may store information identifying a site associated with video wall 170, such as a particular location. Each time period record 530 may store information relating to a particular time period. For example, the information in event record 500 may be updated at particular intervals that separate the time periods. Time period record 530 may include a time period field 532 and one or more person records 540.

Time period field 532 may store information identifying a particular time period. Each person record 540 may store information related to a particular person detected in the crowd associated with the particular event during the particular time period. Person record 540 may include a person field 550, a user field 560, an instance field 570, and an object/area field 580.

Person field 550 may identify a particular person in a crowd of persons identified by person detection logic 320. For example, each identified person may be assigned a location identifier that identifies the particular person's position in the crowd. Person field 550 may not store any personal information associated with the particular person. User field 560 may store information indicating whether the particular person is a user. A particular person may be designated as a user if the particular person is making gestures and/or controlling an object or area during the particular time period or a previous time period.

Instance field 570 may store information identifying a particular gesture tracking instance 340 designated to track the particular person if the particular person is designated as a user. Object/area field 580 may store information identifying an object or area associated with content displayed on video wall 170. For example, object/area field 580 may include an object ID, an area ID, and/or another kind of ID used to track the object or area controlled by the particular person.

Although FIG. 5 shows exemplary components of user DB 325, in other implementations, user DB 325 may include fewer components, different components, additional components, or differently arranged components than depicted in FIG. 5.

Figure 6:
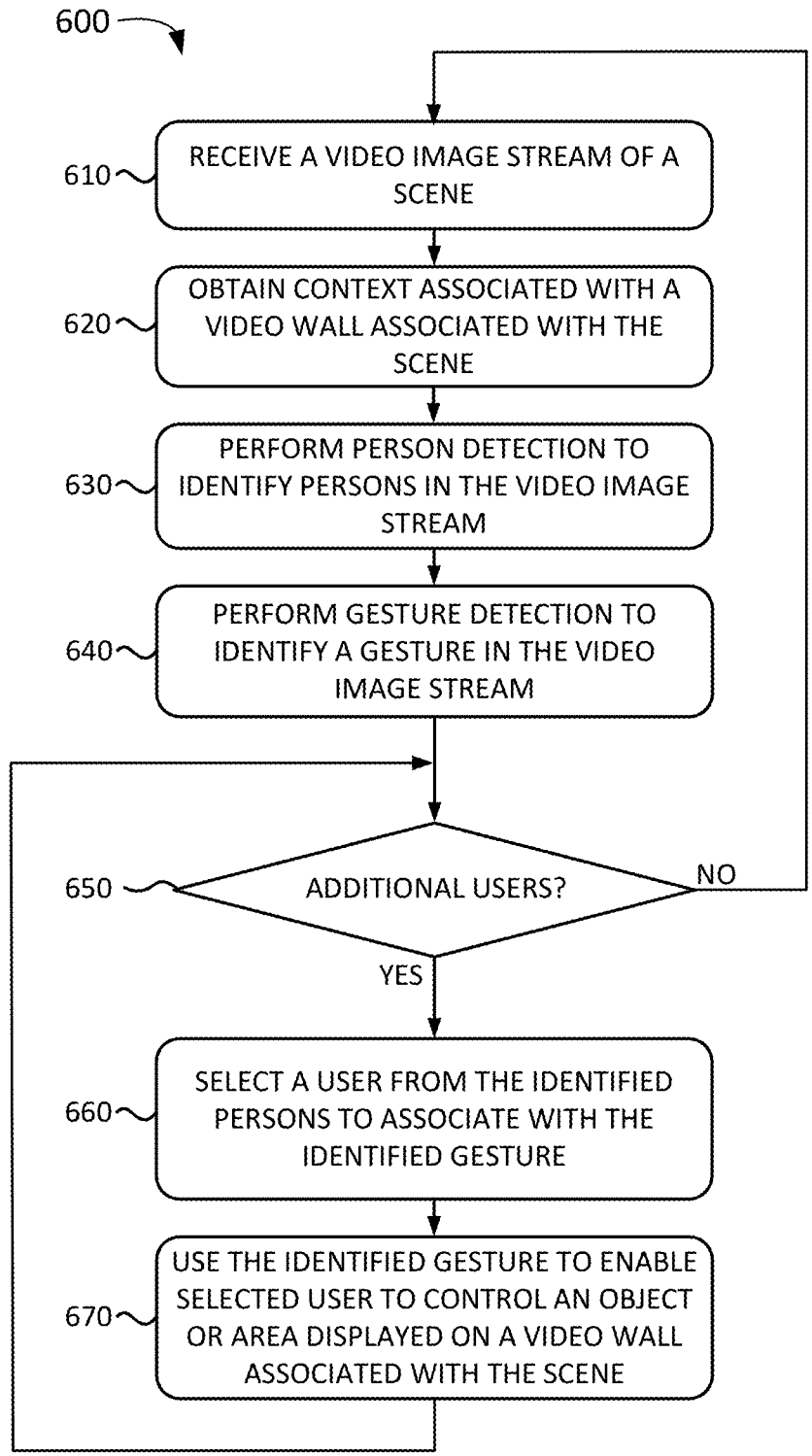
FIG. 6 illustrates a flowchart of a process for controlling video wall content using air gestures according to an implementation described herein.

FIG. 6 illustrates a flowchart of a process 600 for controlling video wall content using air gestures according to an implementation described herein. In some implementations, process 600 of FIG. 6 may be performed by MEC device 135. In other implementations, some or all of process 600 may be performed by another device or a group of devices separate from MEC device 135.

As shown in FIG. 6, process 600 may include receiving a video image stream of a scene (block 610). For example, gesture analysis system 300 may receive a video stream from one or more cameras 110 of crowd of persons 115 making air gestures to interact with content displayed on video wall 170. Context associated with a video wall associated with the scene may be obtained (block 620). For example, gesture analysis system 300 may receive context information from video wall controller 160, such as, for example, information identifying an application running on video wall controller 160 and being displayed by video wall 170, a type of event displayed by video wall 170, etc.

Person detection may be performed to identify persons in the video image stream (block 630) and gesture detection may be performed to identify a gesture made in the video image stream (block 640). For example, gesture analysis model 300 may use one or more computer vision machine learning models to identify individual people in images included in the obtained video image stream. For each detected person, gesture analysis system 300 may then determine whether the person is making a gesture. If an identified person is determined to be making a gesture, the identified person may be designated as a user. Each designated user may then be processed by selecting individual users.

A determination may be made as to whether there are additional users (block 650). If there are no additional users (block 650—NO), processing may return to block 610 to continue to receive the video image stream. If there are additional users (block 650—YES), a user may be selected from the identified persons to associate with the identified gesture (block 660), and the identified gesture may be used to enable the selected user to control an object or area displayed on the video wall associated with the scene (block 670). An exemplary process for enabling a user to control an object or area displayed on video wall 170 is described below with reference to FIG. 7.

Figure 7:
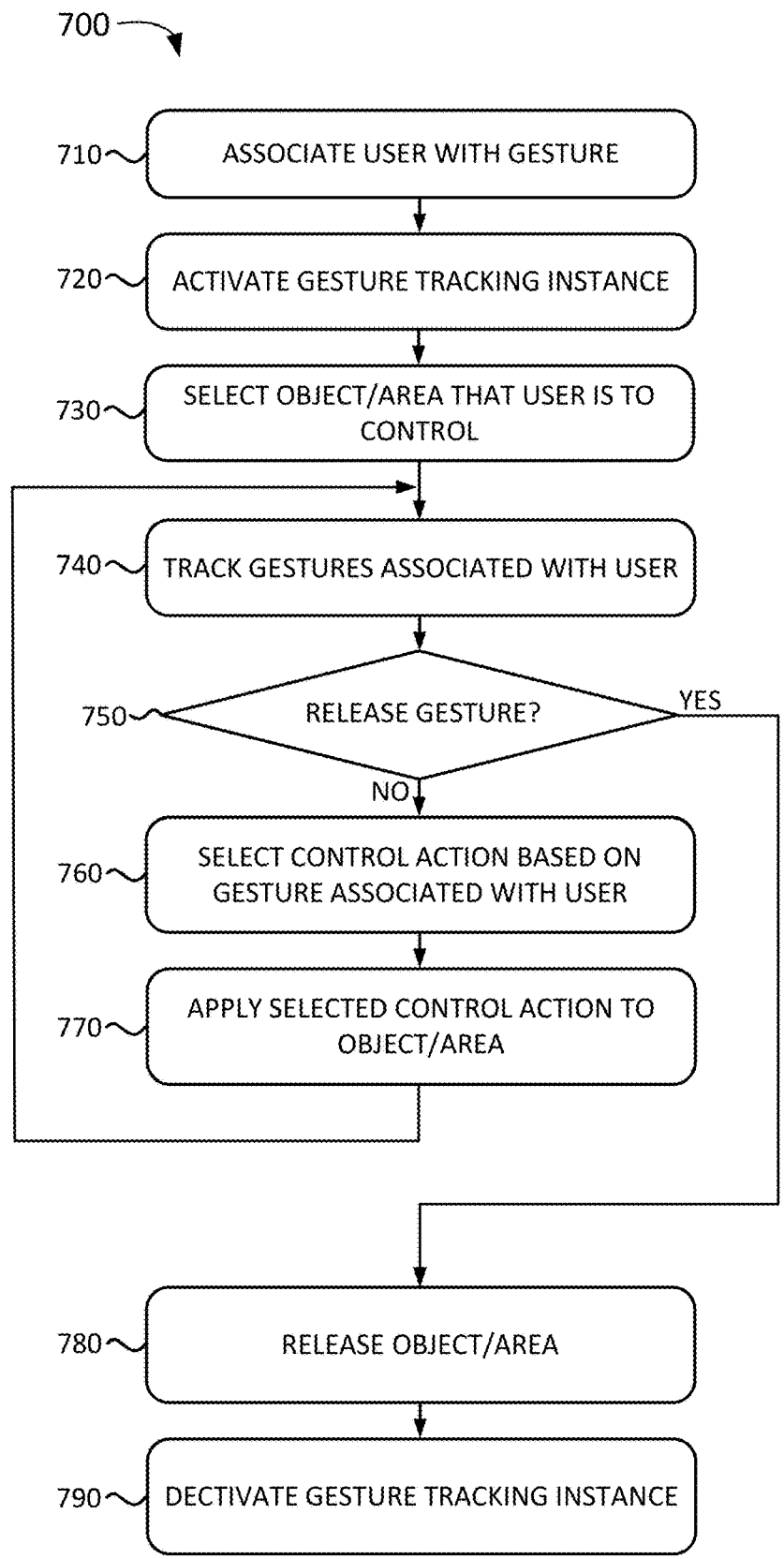
FIG. 7 illustrates a flowchart of a process for using gesture tracking instances according to an implementation described herein.

FIG. 7 illustrates a flowchart of a process 700 for using gesture tracking instances according to an implementation described herein. In some implementations, process 700 of FIG. 7 may be performed by MEC device 135. In other implementations, some or all of process 700 may be performed by another device or a group of devices separate from MEC device 135, such as video wall controller 160.

As shown in FIG. 7, process 700 may include associating a user with a gesture (block 710) and activating a gesture tracking instance (block 720). For example, for each designated user, gesture analysis system 300 may activate a gesture tracking instance 340 to track gestures made by the user. An object or area displayed on video wall 170 that a user is to control may be selected (block 730) and gestures associated with the user may be tracked (block 740). Gesture tracking system 300 may assign an object or area displayed on video wall 170 to the user based on the position of a gesture. As an example, a user may point, make a grabbing gesture, or otherwise provide a gesture toward a particular area of video wall 170 to indicate which object or area the user is selecting to control. As another example, the user may visualize video wall 170 in front of the user and gesture toward an area (e.g., to the left of the user to select an object to the left, etc.). Once an object or area is assigned to the user, the object or area may be made unavailable to other users until the object or area is released from the user.

A determination may be made as to whether a release gesture has been detected (block 750). A user may make a particular gesture to release an object or area. For example, the user may make a swiping or throw-away gesture to indicate the user wishes to release the object or area the user has been controlling. Additionally, or alternatively, the user may stop making gestures and the object or area may be released after a period of inactivity has elapsed. Furthermore, the user may be assigned a time limit and the object or area may be released after the time limit has been reached, if the user has not released the object or area.

If a release gesture has not been detected (block 750—NO), a control action based on the gesture associate with the user may be selected (block 760), and the selected control action may be applied to the object or area (block 770). Gesture analysis system 300 may map the user's gestures into control actions for the object or area the user is controlling. For example, gesture analysis system 300 may output a control message that includes a control action and a screen position and provide the control message to video wall controller 160. In response, the displayed object or area on video wall 170 changes based on the user's gestures. Processing may return to block 740 to continue to track gestures associated with the user.

If a release gesture has been detected (block 750—YES), the object or area displayed on video wall 170 may be released (block 780) and the gesture tracking instance may be deactivated (block 790). For example, after the user makes a release gesture, after a period of inactivity, or after a time limit has been reached, the object or area controlled by the user may be released, allowing the object or area displayed on video wall 170 to be controlled by another user. Furthermore, gesture analysis system 300 may deactivate gesture tracking instance 340 associated with the user.

Figure 8:
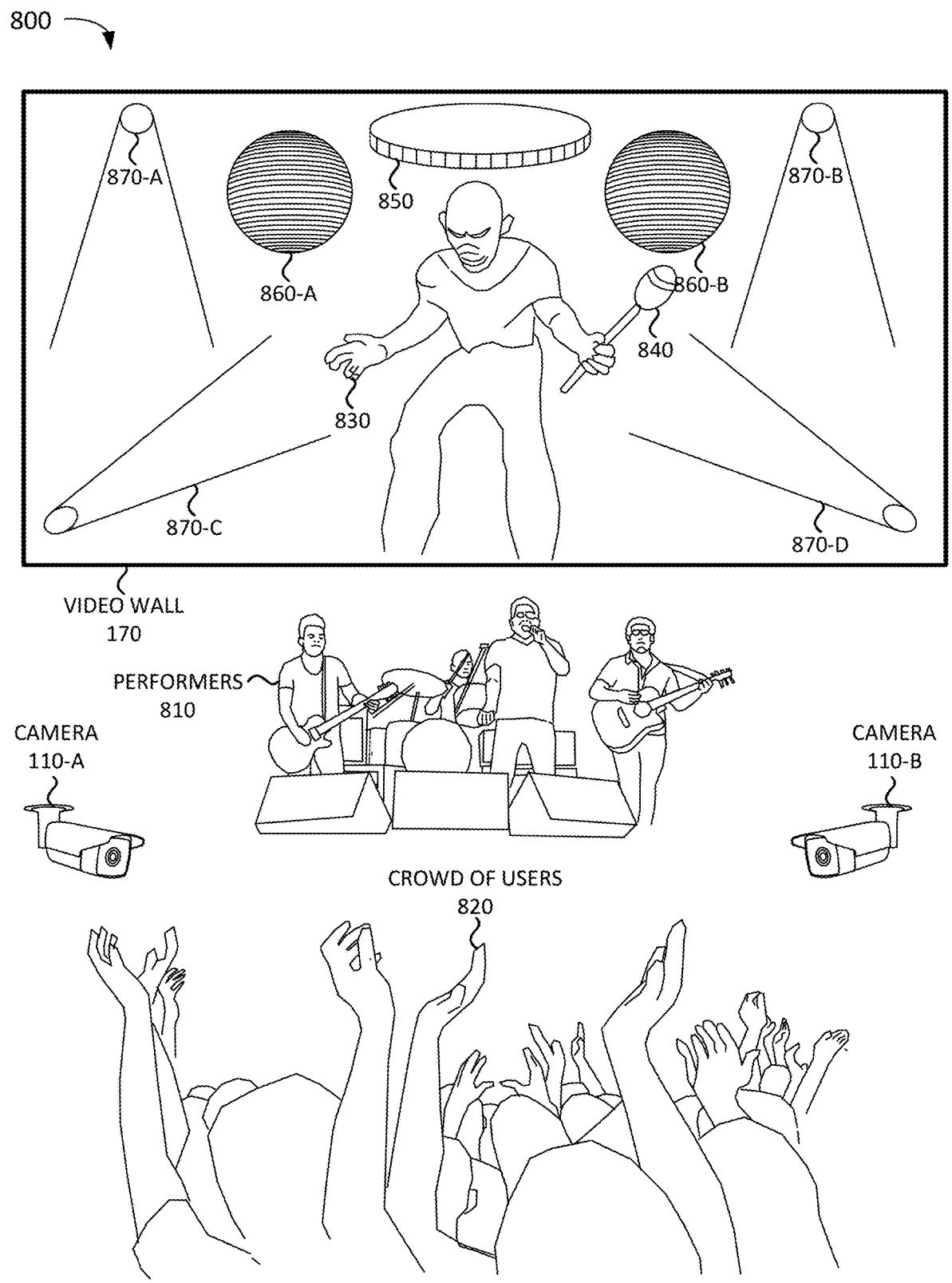
FIG. 8 illustrates a first exemplary implementation of controlling video wall content using air gestures.

FIG. 8 illustrates a first exemplary implementation 800 of controlling video wall content using air gestures. As shown in FIG. 8, implementation 800 may include video wall 170, performers 810, a crowd of users 820, and cameras 110-A and 110-B. Performers 810 may be performing at a music venue in front of video wall 170. Users in crowd of users 820 may make gestures in the air to control content displayed on video wall 170. Cameras 110-A and 110-B may capture a video stream of the gestures made by the users and send the captured video stream to gesture analysis system 300 in MEC device 135 (not shown in FIG. 8) using a wireless 5G connection. Gesture analysis system 300 may generate control actions based on the obtained video stream and provide information relating to the generated control actions to video wall controller 160 (not shown in FIG. 8). Video wall controller 160 may display the result of the control actions on video wall 170.

For example, video wall 170 may display a dancing mascot FIG. 830 holding an object 840, a multicolored disk 850 floating in the air, mirror balls 860-A and 860-B, and colored floodlights 870-A, 870-B, 870-C, and 870-D. A user may make a grasping motion toward a particular object or area of video wall 170 to control a displayed object. As an example, a user may move or position mascot FIG. 830 to make FIG. 830 dance or assume different positions. As another example, a user may change object 840 to a different object or make object 840 point in different directions. As yet another example, a user may spin multicolored disk 850 or spin or move mirror balls 860-A or 860-B to different locations of video wall 170. As yet another example, a user may point floodlights 870-A, 870-B, 870-C, and 870-D in different directions or change the color of light.

Figure 9:
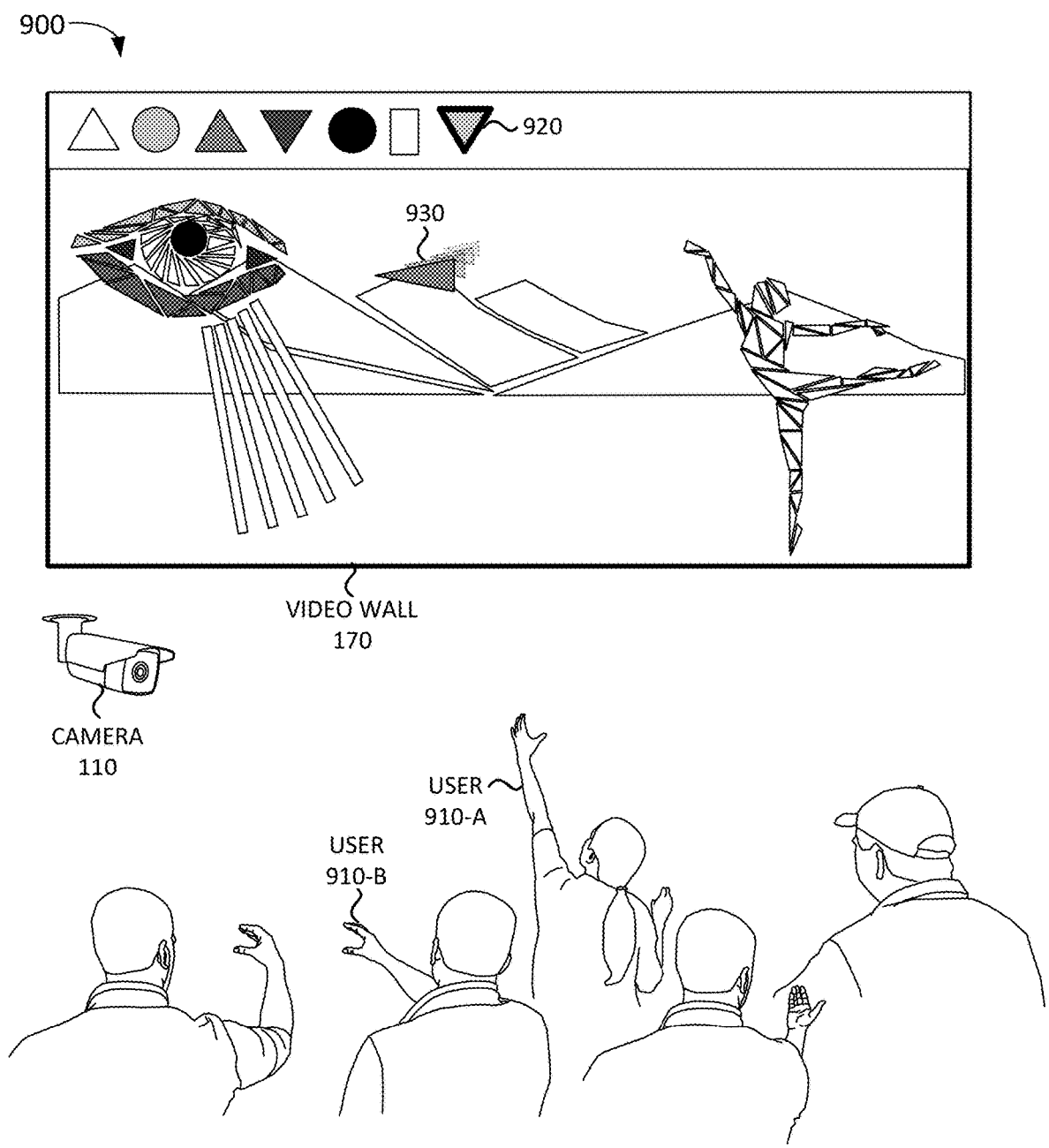
FIG. 9 illustrates a second exemplary implementation of controlling video wall content using air gestures.

FIG. 9 illustrates a second exemplary implementation 900 of controlling video wall content using air gestures. As shown in FIG. 9, implementation 900 may include video wall 170 and camera 110. Users may make gestures in the air to control content displayed on video wall 170. Camera 110 may capture a video stream of the gestures made by the users and send the captured video stream to gesture analysis system 300 in MEC device 135 (not shown in FIG. 9) using a wireless 5G connection. Gesture analysis system 300 may generate control actions based on the obtained video stream and provide information relating to the generated control actions to video wall controller 160 (not shown in FIG. 9). Video wall controller 160 may display the result of the control actions on video wall 170.

Furthermore, video wall 170 may display collaborative art content that is shared across multiple video walls 170 in remote locations. For example, multiple outdoor malls in a city, or in multiple cities, may display identical shared content. Each site may include camera 110 sending the captured video stream to gesture analysis system 300 in MEC device 135 using a wireless 5G connection. Gesture analysis systems 300 associated with the multiple sites may share information with each other. For example, each time a particular gesture analysis system 300 generates a control action associated with video wall 170, the particular gesture analysis system 300 may send the control action to the other gesture analysis systems 300 so that the content is updated at all the sites.

For example, video wall 170 may display a collaborative art project that enables users to create mosaic shapes or images using different provided shapes. User 910-A may make a reaching gesture to grab an available shape 920 and shape 920 may be highlighted, indicating the user has control over the shape and may place the shape at a particular location and/or stretch or rotate the shape. User 910-B may move shape 930 using a moving side to side hand motion and shape 930 may be animated to indicate that user 910-B is controlling and moving shape 930.

Figure 10:
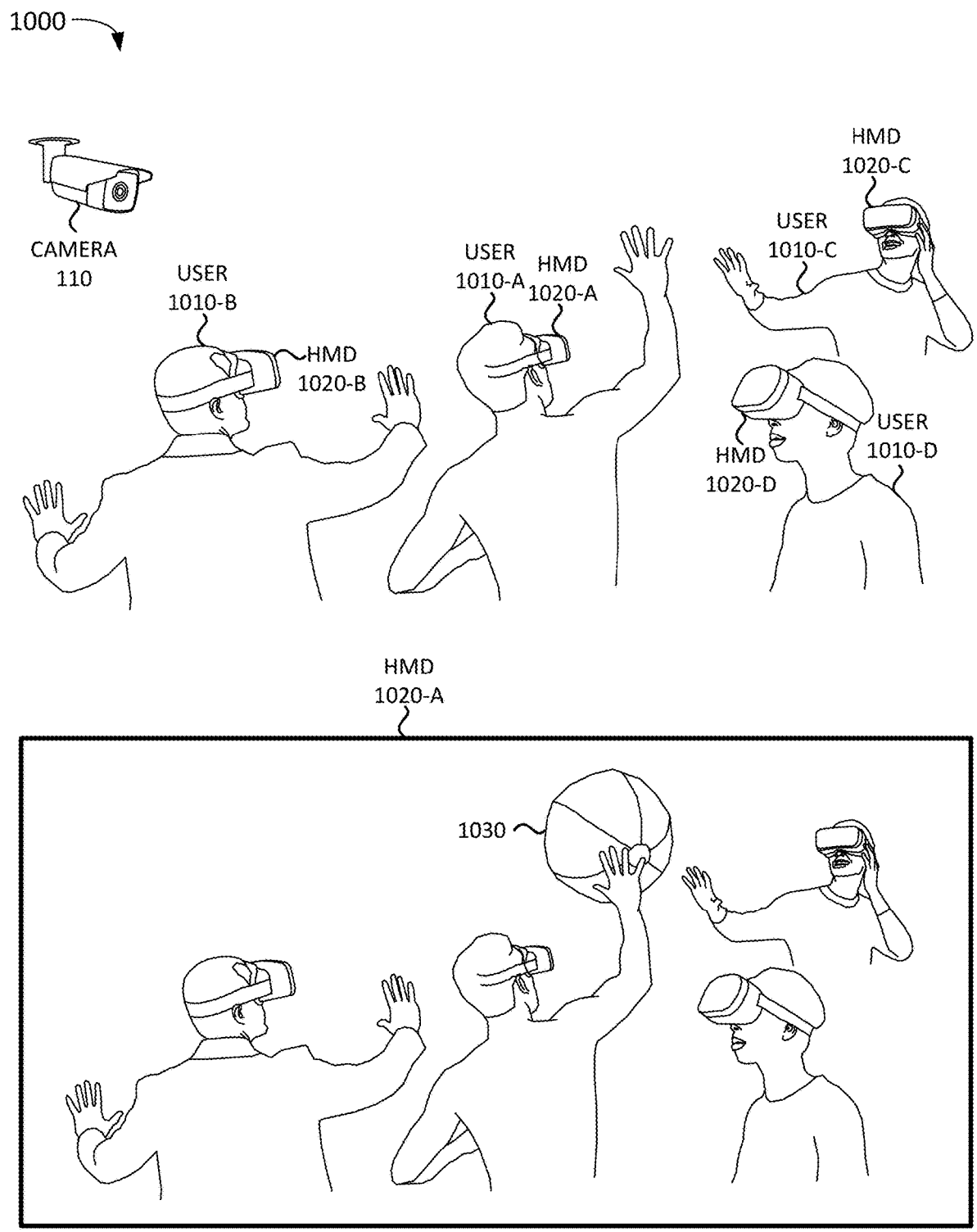
FIG. 10 illustrates a third exemplary implementation of controlling video wall content using air gestures.

FIG. 10 illustrates a third exemplary implementation 1000 of controlling video wall content using air gestures. As shown in FIG. 10, implementation 1000 may include camera 110 and users 1010-A, 1010-B, 1010-C, and 1010-D. User 1010-A may be wearing a HMD 1020-A, user 1010-B may be wearing HMD 1020-B, user 1010-C may be wearing HMD 1020-C, and user 1010-D may be wearing HMD 1020-D. In this implementations, HMDs 1020-A, 1020-B, 1020-C, and 1020-D may function as augmented reality displays and may also together function as video wall 170.

Users 1010-A, 1010-B, 1010-C, and 1010-D may make gestures in the air to control content displayed on HMDs 1020-A, 1020-B, 1020-C, and 1020-D. Cameras 110 may capture a video stream of the gestures made by the users and send the captured video stream to gesture analysis system 300 in MEC device 135 (not shown in FIG. 10) using a wireless 5G connection. Gesture analysis system 300 may generate control actions based on the obtained video stream and provide information relating to the generated control actions to video wall controller 160 (not shown in FIG. 10), which may generate and coordinate content to be displayed on HMDs 1020-A, 1020-B, 1020-C, and 1020-D.

For example, HMD 1020-A may display a virtual ball 1030 while enabling users 1010-A, 1010-B, 1010-C, and 1010-D to see each other. The users may make gestures to catch and throw ball 1030 and gesture analysis system 300 may generate control actions based on the gestures to move ball 1030 as displayed on HMDs 1020-A, 1020-B, 1020-C, and 1020-D.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving, by a device, a video image stream of a scene;
   performing, by the device and on the received video image stream, person detection to identify a plurality of persons;
   performing, by the device and on the received video image stream, gesture detection to identify a gesture, wherein performing gesture detection to identify the gesture in the received video image stream includes:
      activating a gesture tracking instance, wherein the gesture tracking instance includes a computer vision machine learning model;
   selecting, by the device, a person from the identified plurality of persons in the received video image stream;
   associate, by the device, the selected person with the activated gesture tracking instance; and
   using, by the device, the activated gesture tracking instance to enable the selected person to control an object or area displayed on a video screen associated with the scene.

2. The method of claim 1, wherein using the activated gesture tracking instance to enable the selected person to control the object or area displayed on the video screen includes:
   selecting an object or area identifier associated with the object or area based on the identified gesture;
   assigning the selected object or area identifier to the selected person;
   tracking gestures made by the selected person via the activated gesture tracking instance;
   generating action identifiers based on the tracked gestures; and
   applying the generated action identifiers to the selected object or area identifier.

3. The method of claim 1, further comprising:
   identifying another gesture in the received video image stream;
   selecting another person from the plurality of persons to associate with the identified other gesture; and
   activating another gesture tracking instance, in response to selecting the other person.

4. The method of claim 1, wherein performing gesture detection to identify the gesture in the received video image stream includes:
   identifying a plurality of gestures;
   selecting a different person from the plurality of persons for each of the identified plurality of gestures; and
   enabling each of the selected different persons to control a different object or area displayed on the video screen.

5. The method of claim 1, wherein using the activated gesture tracking instance to enable the selected person to control the object or area displayed on the video screen associated with the scene includes:
   obtaining a context associated with the video screen;
   selecting a control action associated with the identified gesture based on the obtained context; and
   applying the selected control action to the object or area displayed on the video screen.

6. The method of claim 1, further comprising:
   detecting another gesture associated with the person;
   determining that the detected other gesture corresponds to a release gesture; and
   releasing control of the object or area from the person, in response to determining that the detected other gesture corresponds to the release gesture.

7. The method of claim 1, wherein using the activated gesture tracking instance to enable the selected person to control the object or area displayed on the video screen associated with the scene includes:
   determining a position of the identified gesture in relation to the selected person; and
   selecting the object or area based on the determined position.

8. The method of claim 1, wherein using the activated gesture tracking instance to enable the selected person to control the object or area displayed on the video screen associated with the scene includes:
   outputting a control message that includes a control action and a screen position; and
   providing the control message to a device controlling the video screen.

9. The method of claim 8, further comprising:
   receiving another control message from a device associated with a remote scene; and
   providing the other control message to the device controlling the video screen.

10. The method of claim 1, wherein the video image stream is received from a camera capturing images of the scene and wherein the computer device is located in a Multi-Access Edge Computing (MEC) network.

11. A device comprising:
    a processor configured to:
       receive a video image stream of a scene;
       perform person detection on the received video image stream to identify a plurality of persons;
       perform gesture detection on the received video image stream to identify a gesture, wherein, when performing gesture detection to identify the gesture in the received video image stream, the processor is further configured to:
   activate a gesture tracking instance, wherein the gesture tracking instance includes a computer vision machine learning model;
   select a person from the identified plurality of persons to associate with the activated gesture tracking instance; and
   use the activated gesture tracking instance to enable the selected person to control an object or area displayed on a video screen associated with the scene.

12. The device of claim 11, wherein, when using the activated gesture tracking instance to enable the selected person to control the object or area displayed on the video screen, the processor is further configured to:
   select an object or area identifier associated with the object or area based on the identified gesture;
   assign the selected object or area identifier to the selected person;
   track gestures made by the selected person via the activated gesture tracking instance;
   generate action identifiers based on the tracked gestures; and
   apply the generated action identifiers to the selected object or area identifier.

13. The device of claim 11, wherein the processor is further configured to:
   identify another gesture in the received video image stream;
   select another person from the plurality of persons to associate with the identified other gesture; and
   activate another gesture tracking instance, in response to selecting the other person.

14. The device of claim 11, wherein, when performing the gesture detection to identify the gesture in the received video image stream, the processor is further configured to:
   identify a plurality of gestures;
   select a different person from the plurality of persons for each of the identified plurality of gestures; and
   enable each of the selected different persons to control a different object or area displayed on the video screen.

15. The device of claim 11, wherein, when using the activated gesture tracking instance to enable the selected person to control the object or area displayed on the video screen associated with the scene, the processor is further configured to:
   obtain a context associated with the video screen;
   select a control action associated with the identified gesture based on the obtained context; and
   apply the selected control action to the object or area displayed on the video screen.

16. The device of claim 11, wherein, when using the activated gesture tracking instance to enable the selected person to control the object or area displayed on the video screen associated with the scene, the processor is further configured to:
   output a control message that includes a control action and a screen position; and
   provide the control message to a device controlling the video screen.

17. The device of claim 11, wherein the video image stream is received from a camera capturing images of the scene via a base station, and wherein the device is located in a Multi-Access Edge Computing (MEC) network associated with the base station.

18. A system comprising:
   a camera configured to:
      capture video images of a scene; and
      transmit a video image stream based on the captured video images via a Fifth Generation (5G) wireless connection; and
   a Multi-Access Edge Computing (MEC) device configured to:
      receive the video image stream from the camera;
      perform person detection to identify a plurality of persons in the video image stream;
      perform gesture detection to identify a gesture in the received video image stream, wherein, when performing gesture detection to identify the gesture in the received video image stream, the MEC device is further configured to:
         activate a gesture tracking instance, wherein the gesture tracking instance includes a computer vision machine learning model;
      select a person from the plurality of persons to associate with the identified gesture; and
      use the identified gesture to enable the selected person to control an object or area displayed on a video screen associated with the scene.

19. The system of claim 18, wherein the MEC device is further configured to:
   identify another gesture in the received video image stream;
   select another person from the plurality of persons to associate with the identified other gesture; and
   activate another gesture tracking instance, in response to selecting the other person.

20. The system of claim 18, wherein, when using the activated gesture tracking instance to enable the selected person to control the object or area displayed on the video screen associated with the scene, the MEC device is further configured to:
   obtain a context associated with the video screen;
   select a control action associated with the identified gesture based on the obtained context; and
   apply the selected control action to the object or area displayed on the video screen.

* * * * *